United States Patent Office 3,075,681
Patented Jan. 29, 1963

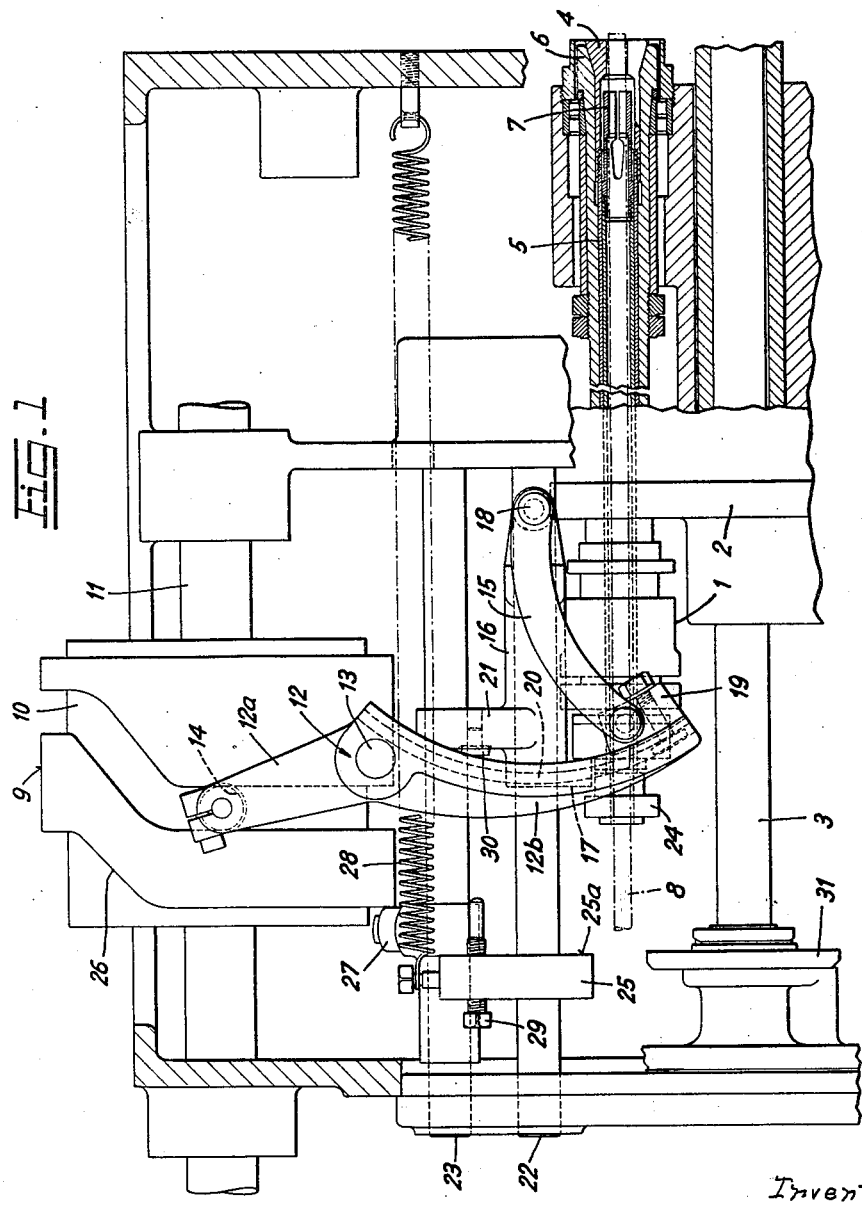

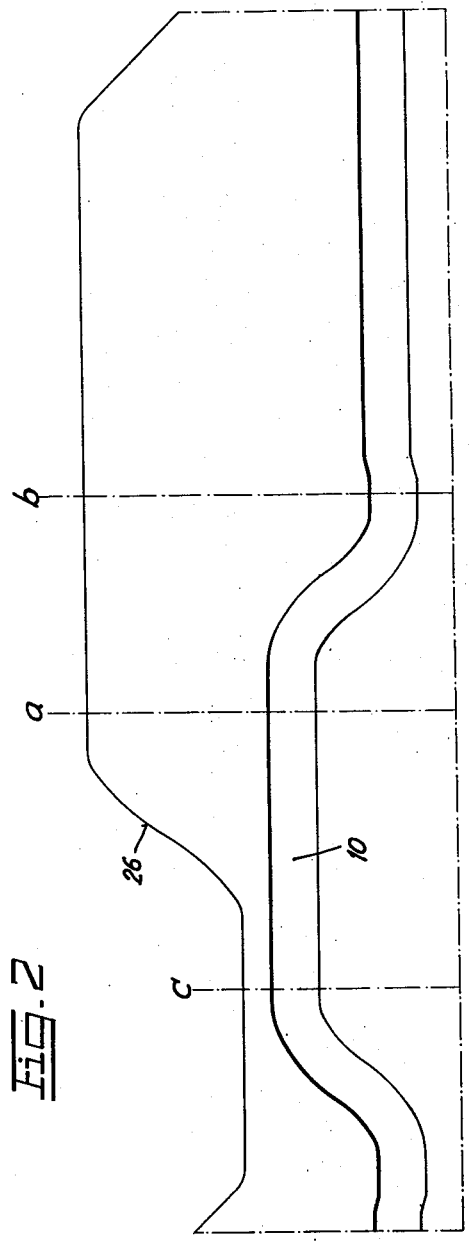

3,075,681
STOCK FEEDING DEVICE FOR MULTIPLE-STATION INDEXING MACHINES
Guillaume Ernest Megel and Henri Mancia, Moutier, Switzerland, assignors to Usines Tornos, Fabrique de Machines Moutier S.A., Moutier, Berne, Switzerland, a joint-stock company
Filed Sept. 8, 1960, Ser. No. 54,792
Claims priority, application Switzerland Sept. 11, 1959
1 Claim. (Cl. 226—158)

This invention relates to stock feeding devices for multiple-station indexing machines and in particular to stock feeding devices for machines adapted to employ bar stock for machining work-pieces of a determined maximum length and having reciprocating stock feeding means coming one after the other upon each indexing operation to a feeding station and provided with stock engaging portions adapted to frictionally grip the stock in feeding the latter in the feeding direction of movement and to slip relative to the stock when the latter is held and said stock feeding means is moved in the return or non-feeding direction.

The spindles of machines such as automatic lathes of the type indicated which are known in the art are usually mounted in a revolving drum and this drum is rotated step by step under the control of synchronized camming means so that said spindles successively come to different stations, the number of which corresponds to that of the spindles. Tools are provided at each station and these tools are usually mounted on a common slide so that they can be moved together toward the work pieces held by said spindles to effect machining operations thereon. Each spindle drives therefore a stock bar in rotation and holds said stock bar in such a position that a front portion thereof, having a length substantially corresponding to that of the work pieces, is extending in front of the spindle.

In the automatic lathes of this type the feeding operation is usually carried out at a predetermined station. This feeding operation comprises the steps of opening the chucking collet of the spindle which is in the feeding station, moving the stock bar forward through a distance which substantially corresponds to the length of the work pieces actually machined, and closing the chucking collet again. All the operations of the lathes of said type are usually controlled by cams set on a common shaft to ensure an absolute synchronization of said operations. The bar feeding operations in particular are also controlled by a cam set on said shaft. The latter cam is usually provided with a groove to reciprocate a follower comprising a pair of gripping members fixed with respect to one another for seizing therebetween and actuating the collar or spool of the finger tube constituting the feeding means of the spindle which is at the feeding station.

The groove of the cam controlling the feeding operations is arranged so as to cause the forward gripping member to engage the collar or spool of the finger tube and to move this finger tube first backward while the chucking collet still grips the stock bar, and to cause then the rear gripping member to engage said collar and to move the finger tube forward while the chucking collet is open thus feeding the stock bar.

In the machines of the type indicated which are known in the art, the finger tube is mounted as a piece which is completely independent from the spindle. When a stock bar is gripped by the chucking collet of the spindle and driven in rotation thereby, this stock bar normally serves, however, as supporting means for the finger tube.

When there is no stock bar in a lathe spindle, the finger tube associated with this spindle is accordingly entirely free. This is usually the case for instance when the lathe elements are adjusted to make the lathe ready for machining a series of work pieces. A finger tube becomes also free during the operation of the lathe, for instance after it has fed a stock bar forward as far as possible. When the corresponding spindle comes the next time to the feeding station, its finger tube is namely pulled backward by the reciprocating gripping member which acts on it and this finger tube leaves then the rear end of the stock bar which is still gripped by the chucking collet. If the lathe remains in operation and if a new bar of stock is not supplied to this spindle at this time, i.e. as soon as its finger tube becomes free, this spindle leaves the feeding station and travels round one step forward during each indexing operation, until it comes to the feeding station again. At this moment the finger tube which is not held by a stock bar would however not lie with certitude in such an axial position that its collar or spool would enter the gap between the two actuating members provided at the feeding station for reciprocating this finger tube if limiting means such as stops, guiding surfaces, safety members and the like were not provided to keep the finger tube at least of the spindle which comes to the feeding station in the desired axial position.

The solutions hitherto known in the art have, however, several drawbacks. Since the lathe can be used to machine work pieces having different lengths, the limiting means in question must be set differently according to the actual length of the pieces to be machined. These limiting means have thus to be adjusted every time when making the lathe ready for machining a new series of pieces. It can thus even occur that setting said limiting means is completely forgotten or that said limiting means are inaccurately set. In both cases the collar or spool of a finger tube can happen to fall out of the gap of said reciprocating members when said finger tube is coming to the feeding station, thus injuring parts of the lathe.

It is therefore an object of this invention to improve the feeding devices of the type indicated so that adjusting the limiting means provided for the collars of the finger tubes can be dispensed with while still increasing the safety of the operation of the lathe or the machine provided with such a feeding device.

Still further objects of this invention will become apparent in the course of the following description.

One embodiment of the feeding device according to the invention is represented diagrammatically and by way of example in the drawings annexed to this specification.

In the drawings:

FIG. 1 is a part elevational view with some parts in section of an automatic lathe provided with the feeding device according to the invention, and FIG. 2 is a developed view of the cam controlling said device.

The lathe represented is provided with a plurality of spindles 1. Only one of these spindles is shown in the drawings, but it will be understood that the lathe can comprise six similar spindles regularly arranged around its axis. These spindles are mounted in a revolving drum 2 rotatably arranged on a central shaft 3 of the lathe, coaxially thereto. Each spindle comprises a conventional drawback collet chuck. The closing and opening motions of said chuck are controlled as usual by means of dogs (not shown) acting on a chuck actuating sleeve 5 so as to urge the chuck collet 4 in an axial direction with respect to a tubular body member 6 of said spindle. Each spindle is held in a predetermined axial position with respect to the revolving drum and consequently with respect to the lathe so that the stock bar held thereby must be moved forward through the chucking collet of the spindle every time a new work piece is to be machined at the end of the stock bar. The forward motion of the stock bar through the corresponding spindle constitutes the feeding and it has to occur through a distance which substantially corresponds to the length of the work pieces to be machined. In fact this distance is a little bit greater than the length of the work pieces to be machined, for the following reason. Some length of the bar has first to be sacrificed for severing a completely machined work piece therefrom. Moreover, it may occur that some additional material will be lost, if the front face of the work piece, which is initially formed by the severing operation, has to be submitted to a further turning operation. The stock bar has accordingly to be fed through a distance equal to the sum of the work piece length, of the bar length lost during the severing operation and of the bar length possibly lost during turning the work piece front face. Since the last two mentioned lengths are always substantially the same with a stock bar of predetermined diameter, it will be observed that the distance through which the stock bar has to be fed will vary in response to the length of the work pieces to be machined. The feeding operation occurs at a predetermined station of the lathe called hereinafter the feeding station. To ensure the feeding operation each spindle comprises a finger tube 7 extending within the chuck actuating sleeve 5 and behind the chucking collet 4. While the chucking collet 4 is arranged so as to prevent the stock bar 8 from any axial motion with respect to this collet, when it is closed, the resilient fingers of tube 7 are adjusted so as to grip the stock bar 8 and to drive it along as long as no resistance is opposed to the displacements of this bar, but to slip thereon, for instance when the chucking collet 4 is closed or when the stock bar comes in abutting engagement with the bar stop above-mentioned, which is provided as usual in front of the spindle to determine with precision the feeding motion of said stock bar. The feeding operation is thus carried out by tube 7.

The spindle shown in FIG. 1 is that which is at the feeding station of the lathe. The device provided for controlling the feeding operation comprises a grooved cam 9 fixed on to the cam shaft 11 carrying all the controlling cams of the lathe. This cam 9 causes a double-armed lever 12 to rock about a pivot 13 fixed to the lathe's framework. Arm 12a of this lever 12 is carrying a roller 14 plunging into the groove 10 of cam 9. The other arm 12b of this lever is connected by means of a link 15 to a sleeve 16 carrying an actuating member 17 serving as a backward pusher. As shown in FIG. 1 the lever 12 has just moved sleeve 16 in its foremost position. In this position it will be observed that the center of the circle defined by the arc of circle formed by the longitudinal axis of arcuate arm 12b of lever 12 lies on the pivoting axis 18 of link 15. Moreover, since this link 15 has its other end jointed to a block 19 slidably arranged within a longitudinal groove 20 provided in lever arm 12b, and since link 15 thus extends, in the position considered of lever 12, along a radius of the circle above-mentioned whatever the position of block 19 with respect to lever arm 12b may be, it will also be observed that sliding block 19 along groove 20, when lever 12 is in the position represented in FIG. 1, will not modify the position of axis 18. Accordingly sleeve 16 will always come in the same foremost position under the action of lever 12, irrespective of the position in which block 19 will have been set along arm 12b.

If the position of block 19 relative to lever arm 12b thus does not change the foremost position of sleeve 16, it however permits to modify the rearmost position of this sleeve, in which the latter is conducted when cam 9 moves lever 12 clockwise about its rocking axis 13. When the block 19 is set at the end of lever arm 12b as shown in FIG. 1, the cam 9 reciprocates sleeve 16 through the longest possible stroke. The length of this stroke can be reduced by setting block 19 in a position nearer to the pivot 13 of lever 12. The adjustable block 19 thus enables adapting the stroke of sleeve 16 to the length of the work pieces to be machined.

The sleeve 16 is provided with a flange 21 slidably mounted on guiding rods 22 and 23 extending in parallel relation to one another and rigidly fixed to the lathe's framework. The reciprocating member or backward pusher 17, which is made integral with sleeve 16, is provided for moving backward the tube 7 of the spindle which is at the feeding station. For this purpose it is arranged in such a position that it may engage the front face of the collar 24 of said tube 7.

The feeding device disclosed also comprises a second reciprocating member 25 to ensure the forward motion of the tube 7 of the spindle which is at the feeding station. This member 25, which serves as forward pusher, is also slidably mounted on the guiding rods 22 and 23. This member 25 thus can move to and fro along a path extending in parallel relation with that of member 17. The axial displacements of this pusher 25 are controlled by a rear camming surface 26 of cam 9. A roller 27 is therefore held in contact with camming surface 26 by means of a very strong draw spring 28. Member 25 comprises an adjustable abutting screw 29. The forward end of this screw is arranged for coming in abutting contact with a stop 30 fixed to flange 21. The lathe described comprises a stop disc 31 definitely fixed to its central shaft 3.

Since collets 4 and tube 7 of the lathe's spindles have a predetermined capacity, the maximum length of the work pieces, which can be machined on this lathe, cannot exceed a predetermined value; pieces longer than this predetermined value, which depends on the stock bar diameter, could of course not be machined on this lathe, because the portion of the stock bar extending in front of the spindles would not afford a sufficient resistance to the tools so that said stock bar portion would be moved aside by said tools, thus producing inadmissible vibrations of the work piece during the machining operations of the tools. Under these circumstances, the lathe described needs only to be provided with a cam 9 having a groove 10 which enables a stroke of sleeve 16 corresponding at most to the greatest possible length of the work pieces which can be machined on said lathe. It has already been stated that the distance through which the stock bar has to be fed is somewhat greater than the length of the work pieces, because of the material lost during the severing operation and the turning operation of the work piece front face. Moreover, the position in which the stock bar has to come at the end of the feeding operation is limited as usual by a stop arranged in front of the spindle which is at the feeding station. This stop is introduced into the path of the stock bar during the feeding operation in order to limit with a great precision the position in which the stock bar has to come at the end of the feeding operation. Now, in order to make sure that the finger tube will bring the stock bar in this position in any case, the feeding motion of this finger tube is chosen somewhat longer than the distance through which the stock bar has to be fed, so that the finger tube will already bring the stock bar into abutting engagement with said stop before it arrives at the end of its forward stroke and will then slip along the stock bar. The stroke of the finger tube thus corresponds to the work piece length in such a way that it exceeds the same by a small amount comprising the material lost caused by the severing operation and the turning operation of the work piece front face and the excess provided for the safe operation of the feeding device. Furthermore, the stop disc 31 is fixed at a distance from spindles 1 which also corresponds to the longest possible pieces which can be machined on the lathe. More precisely, this stop disc 31 is fixed at such a distance from the spindles that the reciprocating collar 24 of tube 7, which is at the feeding station, can not possibly come in contact with disc 31 during its backward motion under the control of member 17, even when member 17 is moving said collar backward through the longest possible distance mentioned above. It is to be understood that the stop disc 31 functions to prevent the finger tubes 7 from moving out of the spindles which are not at the feeding station. Thus, when the finger tubes 7 are no longer supported by the stock bar 8, as the stock bar 8 becomes diminished, the stop disc 31 prevents the accidental releasing of the finger tubes 7 and the falling of the finger tubes 7 down into the lathe parts which will result in the jamming and damaging of the lathe parts. On the other hand, as pointed out above, the stop disc 31 is so positioned whereby the member 17 will not move the finger tubes 7 into engagement with the stop disc 31.

The feeding device described functions as follows:

When the revolving drum 2 brings a spindle 1 to the feeding station, members 17 and 25 are standing in the respective positions represented in FIG. 1, which correspond to position a of the diagram of FIG. 2. In this position cam 9 holds member 17 in its foremost position, at the end of its forward stroke and the camming surface 26 holds member 25 in its rearmost position, at the end of its rearward stroke. As shown in the drawings the front face 25a of this member 25 stands then somewhat back with respect to the front face of stop disc 31. In these conditions the collar 24 cannot possibly fail to enter the gap provided between members 17 and 25 at the moment at which the corresponding spindle comes to the feeding station shown in FIG. 1, even if no bar holds tube 7 in a predetermined position relative to the chucking collet 4.

As soon as a spindle has reached this feeding station a cutting tool (not shown) cuts the work piece from the stock bar in front of the chucking collet 4. During that cutting operation the cam 9 moves member 17 backward and consequently produces a stroke of tube 7 having a length somewhat greater than that of the work pieces to be machined. After that stroke cam 9 has reached position b of the diagram of FIG. 2. At that moment the chucking collet 4 opens and the camming surface 26 permits member 25 to move forward under the action of spring 28. This member 25 first moves forward until the front end of screw 29 comes in abutting contact with stop 30. After member 25 has thus caught up with member 17, both said members are moved simultaneously forward until cam 9 has reached position c of the diagram of FIG. 2. This last common motion of members 17 and 25 is controlled by the cam 9 conducting member 17, while spring 28 merely applies member 25 against the member 17. During said forward motion of members 17 and 25 the front face 25a of the latter is in abutting engagement with the collar 24 and it moves tube 7 together with the stock bar 8 forward until the front end of this bar comes in contact with the bar stop mentioned above, which is provided in front of the spindle and determines with precision the stock bar length necessary to machine a new work piece in front of the spindle in the other stations of the lathe.

When the stock bar has been fed in the manner described above, the chucking means 4 closes and the camming surface 26 moves member 25 backward to its rearmost position. The feeding cycle has come to its end and the feeding device is ready to enable the revolving drum rotating one step further so as to bring the next spindle to the feeding station.

While one embodiment of our invention has been described in detail with reference to the accompanying drawings, it will be understood that various changes in the shape, sizes and arrangement of parts could be resorted to without departing from the spirit of the invention or sacrificing the advantages thereof.

We claim:

In a multiple-station indexing machine adapted to employ bar stock for machining work pieces of a predetermined maximum length and having reciprocating stock feeding means coming successively to a feeding station and provided with stock engaging portions adapted to frictionally grip the stock in feeding the latter in the feeding direction of movement and to slip relative to the stock when the latter is held and said stock feeding means is moved in the return or non-feeding direction, the combination comprising a fore reciprocating member adapted to urge the stock feeding means which is at the feeding station in the return or non-feeding direction from a foremost position to a rear position, a rear reciprocating member adapted to urge the stock feeding means which is at the feeding station in the feeding direction to cause the feeding operation, stop means definitely fixed behind the stock feeding means to prevent the accidental loss of the stock feeding means which are not at the feeding station, said stop means being located at a distance from the stock feeding means great enough to permit said reciprocating members to freely reciprocate the stock feeding means which is at the feeding station, a control member having a first cammtng surface controlling the motion of the fore reciprocating member and a second camming surface controlling the motion of the rear reciprocating member, and adjustable motion reducing means inserted between said conrtol member and said fore reciprocating member to adjust the stroke thereof relative to the length of the work pieces, said first camming surface holding said fore reciprocating member in its foremost position when stock feeding means comes to the feeding station and said motion reducing means causing the fore reciprocating member to move the stock feeding means of this spindle backward through a distance substantially corresponding to the actual length of the work pieces machined, said second camming surface holding said rear reciprocating member behind said stop means when stock feeding means comes to the feeding station.

References Cited in the file of this patent

UNITED STATES PATENTS

| 1,779,529 | Brophy | Oct. 28, 1930 |
| 1,963,032 | Rupple | June 12, 1934 |
| 2,033,490 | Simpson et al. | Mar. 10, 1936 |
| 2,055,435 | Gridley et al. | Sept. 22, 1936 |
| 2,115,938 | Baxendale | May 3, 1938 |
| 2,333,158 | Dowd | Nov. 2, 1943 |
| 2,376,476 | Chatelain | May 22, 1945 |

FOREIGN PATENTS

| 21,686 | Great Britain | of 1909 |
| 505,554 | Great Britain | May 12, 1939 |
| 15,742 | Great Britain | of 1913 |